Figure 1:
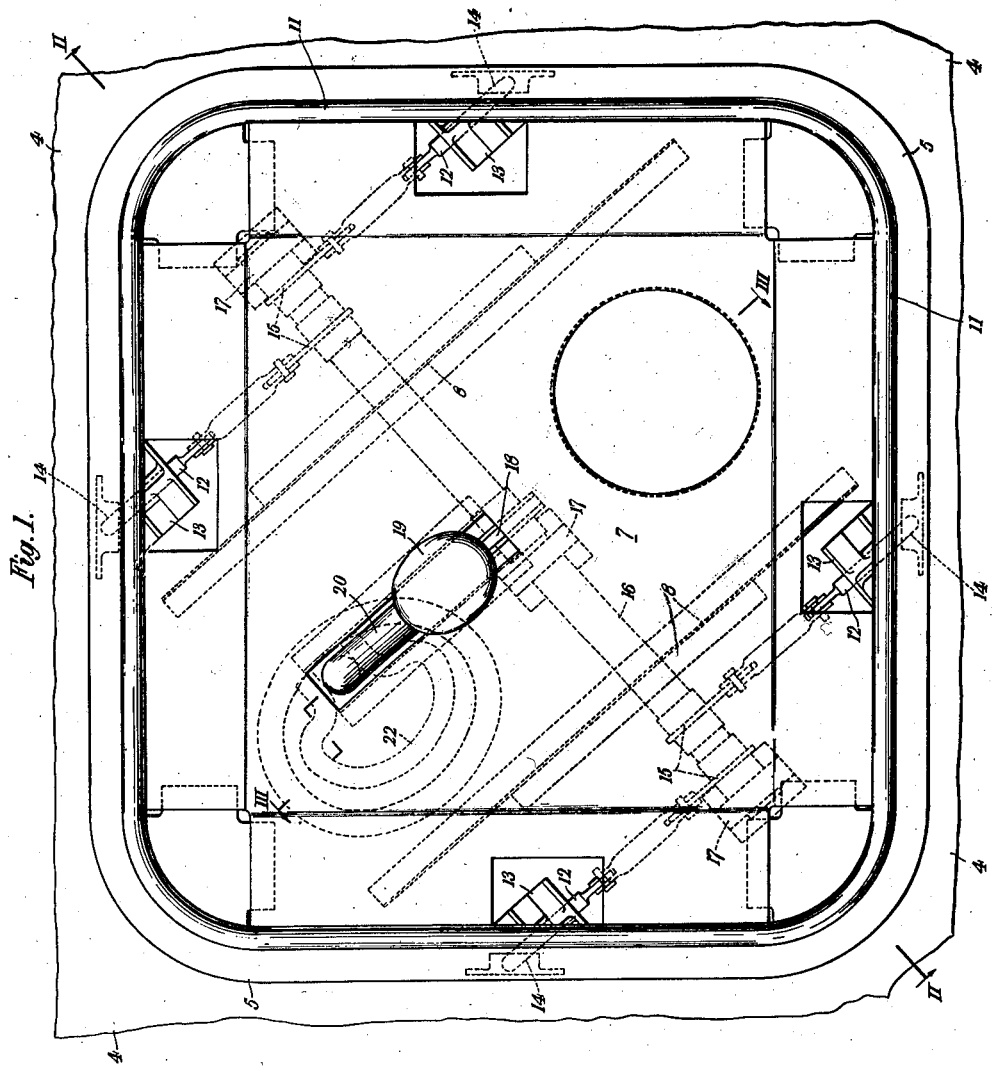

Feb. 23, 1943. R. E. FLAXMAN 2,312,155
EMERGENCY HATCH AND MAN-HOLE COVER
Filed July 25, 1941 2 Sheets-Sheet 1

Feb. 23, 1943.  R. E. FLAXMAN  2,312,155
EMERGENCY HATCH AND MAN-HOLE COVER
Filed July 25, 1941  2 Sheets-Sheet 2
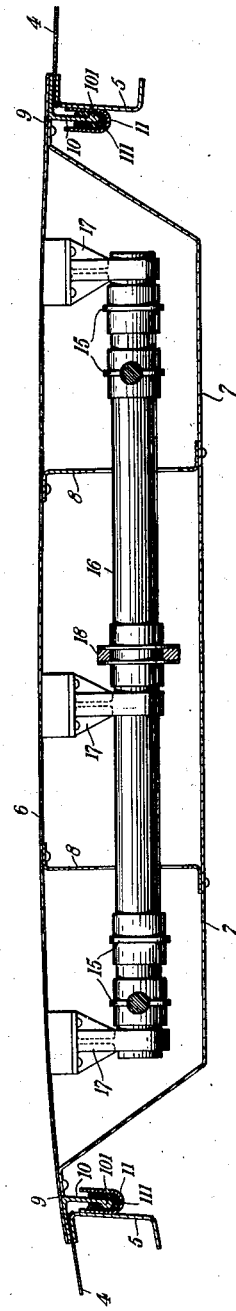
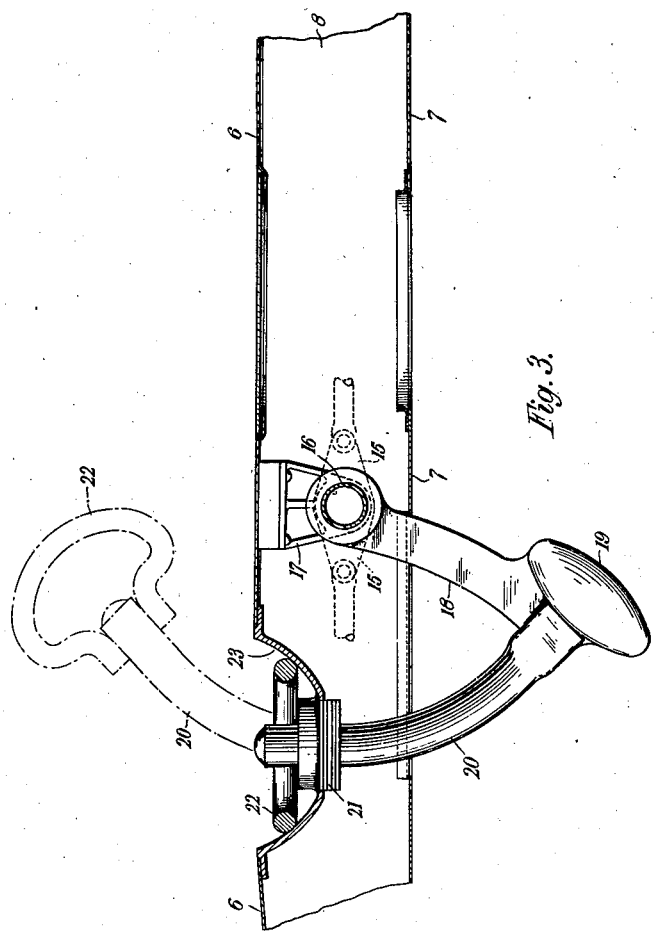

Patented Feb. 23, 1943

2,312,155

UNITED STATES PATENT OFFICE 2,312,155

EMERGENCY HATCH AND MANHOLE COVER

Robert Edward Flaxman, Rochester, England, assignor to Short Brothers (Rochester & Bedford) Limited, Rochester, England Application July 25, 1941, Serial No. 404,091
In Great Britain August 6, 1940

3 Claims. (Cl. 114—201)

This invention has reference to emergency hatch-covers, man-hole covers and the like, such as are used in the hulls, floats or other decked surfaces of flying boats and like vessels, the purpose of the invention being to provide an improved arrangement of such hatches and covers in such manner as to facilitate their release and removal from the deck apertures to which they are fitted and so that they will not be liable to become seized or immovably held in position, e. g., due to corrosion, when maintained closed for long periods.

According to the invention the deck-aperture or the like and the hatch or cover thereof are respectively provided at their peripheries with a trough and a flange, the trough being adapted to contain grease, tallow or other lute and the flange being arranged, when the hatch is closed, so as to extend into said trough and dip into the grease or other lute contained therein.

One embodiment of the invention is illustrated in, and is hereinafter described with reference to the accompanying drawings, of which Fig. 1 is a plan of the underside of a deck-hatch cover suitable for application to the hull of a flying-boat; Fig. 2 is a section taken on the line II—II of Fig. 1, and Fig. 3 is a detail view (in section taken on the line III—III of Fig. 1) depicting one form of the means employed for locking and releasing the hatch.

Referring to the drawings, it will be seen that 4 indicates the deck of the vessel and 5 denotes a stiffening member surrounding the mouth of the hatch aperture to which the cover is applied. The hatch-cover comprises a structure including upper and lower plates 6 and 7 braced apart by transverse beams 8, the edges of said plates being riveted together to form a peripheral lip 9 which, when the hatch-cover is closed, extends around the entire aperture, resting upon the deck. If desired, the deck-plates may be joggled or recessed so as to form a seating in which the hatch-cover may rest with its upper plate 6 flush with the exterior surface of the deck.

The hatch-cover is furnished with a peripheral flange 10, mounted beneath the lip 9 and arranged so as to extend inwardly into a U-shaped trough 11 which is carried by the member 5 so as to surround the mouth of the aperture. The said trough 11 is partially filled with a suitable lute material, such as grease or tallow (indicated at 111) and the flange 10 being arranged to dip into such lute, an air-tight seal is provided when the hatch is closed. In order to ensure the secure embedding of the flange 10 in the lute, said flange is conveniently formed with a bull-nosed or bulged rim, as shown at 101; said portion 101 sinks into the grease or the like when the hatch is closed and the grease closes in over the same, thereby securely maintaining an air-tight joint and assisting in protecting the cover from dislodgment by vibration.

The hatch-cover illustrated in the drawings is provided with locking and release mechanism adapted to be operated from the interior or exterior alternatively, and of such a nature that the action of a person releasing the mechanism from the inside of the vessel will have the additional effect of impelling the hatch outwardly so that it may be thrown clear of the aperture, leaving the latter unobstructed for exit purposes. Such mechanism consists of four bolts 12 slidably mounted in brackets 13 and arranged so as to register with sockets 14 in the mouth of the hatch-aperture. Said bolts are linked at their inner ends to cranks 15 upon a rocking shaft 16 which is mounted in brackets 17 beneath the hatch-cover so as to extend diagonally across the same. A lever 18, having a push-plate 19, is fixed on said shaft 16 and the operation of pushing said plate 19 upwardly has the effect of rocking the shaft and withdrawing the four bolts 12 simultaneously; the hatch-cover is thus released and may be removed by thrusting upwardly against its under surface.

It is convenient also to provide means whereby the hatch may be opened from the exterior. This may consist of an arcuate arm 20 connected to the push-plate 19 and curved about the axis of the shaft 16, the end of said arm 20 pressing through a gland 21 in the hatch-plating 6 and being fitted upon the exterior of the hatch with a handle 22. Said handle 22 may be hinged and adapted normally to lie within the recess 23 formed in the plate 6 for that purpose.

A suitable locking device may be inserted if desired to prevent unauthorized persons operating the hatch from the exterior and this locking device would be released prior to the hatch being used on service. The locking device would of course be releasable on the interior side of the hatch.

In the case of man-holes, or inspection covers, where the hatch does not require to be released from the interior, any suitable locking bolts may be used to hold the hatch in the closed position. These locking devices may suitably consist of individual locking bolts arranged at suitable intervals around the border of the hatch and their operation from the exterior may be effected by the insertion of a coin in a nick by means of which the bolt may be withdrawn by the rotation of the coin moving the neck through an angle, say of 90°.

What I claim as my invention and desire to secure by Letters Patent is:

1. An emergency deck-hatch for a flying boat or like vessel, comprising in combination with a deck, a frame defining the hatch-aperture, a hatch-cover consisting of upper and lower plates, transverse beams bracing said plates apart, and said plates being riveted together to form a peripheral lip arranged to project over and be supported by the border of said frame, a trough suspended from the deck about the interior of said frame, a downwardly-extending peripheral flange upon the hatch-cover and a lute material in said trough, the arrangement being such that when the hatch-cover is closed over said aperture said flange dips into said lute material with freedom for unimpeded withdrawal therefrom when the hatch-cover is raised.

2. An emergency deck-hatch for a flying boat or like vessel as claimed in claim 1, comprising means for locking the hatch-cover to the frame in the closed position of the former, and means on the underside of the hatch-cover and connected with said locking means which when operated serves first to disengage said locking means and secondly as a push-plate for raising the hatch.

3. An emergency deck-hatch for a flying boat or like vessel, as claimed in claim 1, comprising means for locking the hatch-cover to the frame in the closed position of the former, means on the underside of the hatch-cover which when operated serves first to disengage said locking means and secondly as a push-plate for raising the hatch, a gland in the hatch-cover, a connection to said means on the underside of the hatch-cover, said connection projecting through said gland, and a handle fixed to said connection on the exterior of the hatch-cover.

ROBERT EDWARD FLAXMAN.